United States Patent
Kliuchnikov et al.

(10) Patent No.: US 12,045,743 B2
(45) Date of Patent: Jul. 23, 2024

(54) MIXING TECHNIQUES FOR PROBABILISTIC QUANTUM CIRCUITS WITH FALLBACK

(71) Applicant: Microsoft Technology Licensing, LLC, Redmond, WA (US)

(72) Inventors: Vadym Kliuchnikov, Redmond, WA (US); Adam Paetznick, Bellevue, WA (US); Kristin Estella Lauter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 973 days.

(21) Appl. No.: 17/030,610

(22) Filed: Sep. 24, 2020

(65) Prior Publication Data
US 2022/0092454 A1   Mar. 24, 2022

(51) Int. Cl.
*G06N 7/01* (2023.01)
*G06N 10/00* (2022.01)

(52) U.S. Cl.
CPC ............... *G06N 7/01* (2023.01); *G06N 10/00* (2019.01)

(58) Field of Classification Search
CPC ............. G06N 7/00; G06N 7/01; G06N 10/00
USPC ........................................................... 706/52
See application file for complete search history.

(56) References Cited

U.S. PATENT DOCUMENTS

| | | | |
|---|---|---|---|
| 6,295,514 B1 * | 9/2001 | Agrafiotis | B01J 19/0046 703/2 |
| 10,469,087 B1 * | 11/2019 | Granade | G06N 20/00 |
| 2014/0026107 A1 * | 1/2014 | Bocharov | B82Y 10/00 716/101 |
| 2014/0026108 A1 * | 1/2014 | Bocharov | G06N 10/00 716/102 |
| 2014/0118024 A1 * | 5/2014 | Eastin | G06N 10/20 327/366 |

(Continued)

FOREIGN PATENT DOCUMENTS

EP   3192018 B1   8/2019

OTHER PUBLICATIONS

Wang et al., "Optimizing multi-level combinational circuits for generating random bits", 2013 18th Asia and South Pacific Design Automation Conference (ASP-DAC), Jan. 2013, pp. 139-144. (Year: 2013).*

(Continued)

*Primary Examiner* — Hwei-Min Lu
(74) *Attorney, Agent, or Firm* — Holzer Patel Drennan

(57) ABSTRACT

A low-cost solution for performing a quantum operation provides for defining a target unitary that rotates a single qubit by a target rotation to place the qubit in a target state. The method further provides for identifying multiple projective rotation circuits that each implement an approximation of the target rotation upon successful measurement and assigning a selection probability to each of the multiple identified projective rotation circuits, the selection probability being defined by a metric that increases in value in proportion to a proximity between a qubit state resulting from the approximation and the target qubit state. The method further provides for probabilistically selecting one of the multiple projective rotation circuits according to the assigned selection probabilities and outputting a circuit definition that includes the selected projective rotation circuit.

20 Claims, 7 Drawing Sheets

(56) References Cited

U.S. PATENT DOCUMENTS

| | | | | |
|---|---|---|---|---|
| 2014/0264288 | A1* | 9/2014 | Svore | B82Y 10/00 257/31 |
| 2016/0328253 | A1* | 11/2016 | Majumdar | G06N 3/126 |
| 2017/0032272 | A1* | 2/2017 | Bocharov | G06N 5/01 |
| 2017/0194930 | A1* | 7/2017 | Wiebe | G06N 10/00 |
| 2017/0220948 | A1* | 8/2017 | Bocharov | G06F 30/00 |
| 2018/0276014 | A1* | 9/2018 | Kliuchnikov | G06F 9/45508 |
| 2019/0347575 | A1* | 11/2019 | Pednault | G06F 30/30 |
| 2020/0005186 | A1* | 1/2020 | Romero | G06N 10/00 |
| 2021/0406753 | A1* | 12/2021 | Mosca | G06N 10/20 |

OTHER PUBLICATIONS

Wiebe, "Quantum arithmetic and numerical analysis using Repeat-Until-Success circuits", arXiv article: 1406.2040, Jun. 19, 2014. (Year: 2014).*

Bocharov et al., "Efficient synthesis of universal Repeat-Until-Success circuits", arXiv article: 1404.5320, Sep. 19, 2014. (Year: 2014).*

Bocharov et al., "Efficient synthesis of probabilistic quantum circuits with fallback", Physical Review A, vol. 91, Issue 5, May 18, 2015. (Year: 2015).*

Bocharov, et al., "Efficient Synthesis of Probabilistic Quantum Circuits with Fallback", In Journal of Physical Review A, vol. 91, Issue 5, May 18, 2015, 15 Pages.

Campbell, Earl, "Shorter Gate Sequences for Quantum Computing by Mixing Unitaries", In Journal of Physical Review A, vol. 95, Issue 4, Apr. 5, 2017, 8 Pages.

Hastings, Matthew B., "Turning Gate Synthesis Errors into Incoherent Errors", In Repository of arXiv:1612.01011, Dec. 3, 2016, 5 Pages.

"International Search Report and Written Opinion Issued in PCT Application No. PCT/US2021/032209", Mailed Date: Aug. 30, 2021, 24 Pages.

* cited by examiner

# MIXING TECHNIQUES FOR PROBABILISTIC QUANTUM CIRCUITS WITH FALLBACK

BACKGROUND

To realize practical implementation of quantum devices, it is critical to be able to compile high-level quantum algorithms into lower-level fault tolerant circuits. Constraints of a fault-tolerant quantum computing system require that the system provide an available set of quantum gates that form a discrete universal gate set.

A plurality of useful fault-tolerant quantum basis sets arise from augmenting the set of Clifford gates by one or more unitary gates in order to make the gate set universal. Such a gate set is said to be universal if it generates a group of gates that provides a dense coverage over all unitaries. Examples comprise the Clifford+T basis, consisting of the two-qubit controlled-Not gate (CNOT) and the single-qubit Hadamard gate (H) as generators for the Clifford gates, along with the T gate, implementing a relative phase of $e^{i\pi/4}$, the Clifford-$\pi/12$ basis, consisting of CNOT and H gates along with a single qubit-unitary that implements a relative phase of $e^{\pi/12}$, and the Clifford+V basis, consisting of the CNOT and H gates, along with 6 gates that are defined over the cylotomic integers Z[i].

Efficient algorithms for approximating a single qubit gate into each of the universal gate sets Clifford+T and Clifford+V are available in the art. Notably, however, different quantum architectures may, in practice, be incapable of implementing certain gates and also may implement some gates with greater or lesser reliability than others. An additional complication arises from the fact that costs (e.g., processing power, time) increase in proportion to the length of gate sequences actually implemented. These considerations give rise to the problem referred to as "quantum circuit synthesis," e.g., the reduction of a high level quantum algorithm to a sequence of gates that reliably and with acceptable cost be implemented in an actual quantum computing architecture.

SUMMARY

A method for implementing low-cost quantum operations provides for defining a target unitary that rotates a single qubit by a target rotation to place the qubit in a target state and identifying multiple projective rotation circuits that each implement an approximation of the target rotation upon successful measurement. The method further provides for assigning a selection probability to each of the multiple identified projective rotation circuits where the selection probability of each individual one of the projective rotation circuits increases in proportion to a proximity between a qubit state resulting from the approximation and the target qubit state. The method also provides for probabilistically selecting one of the multiple projective rotation circuits according to the respective selection probabilities, and outputting a circuit definition that includes the selected projective rotation circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
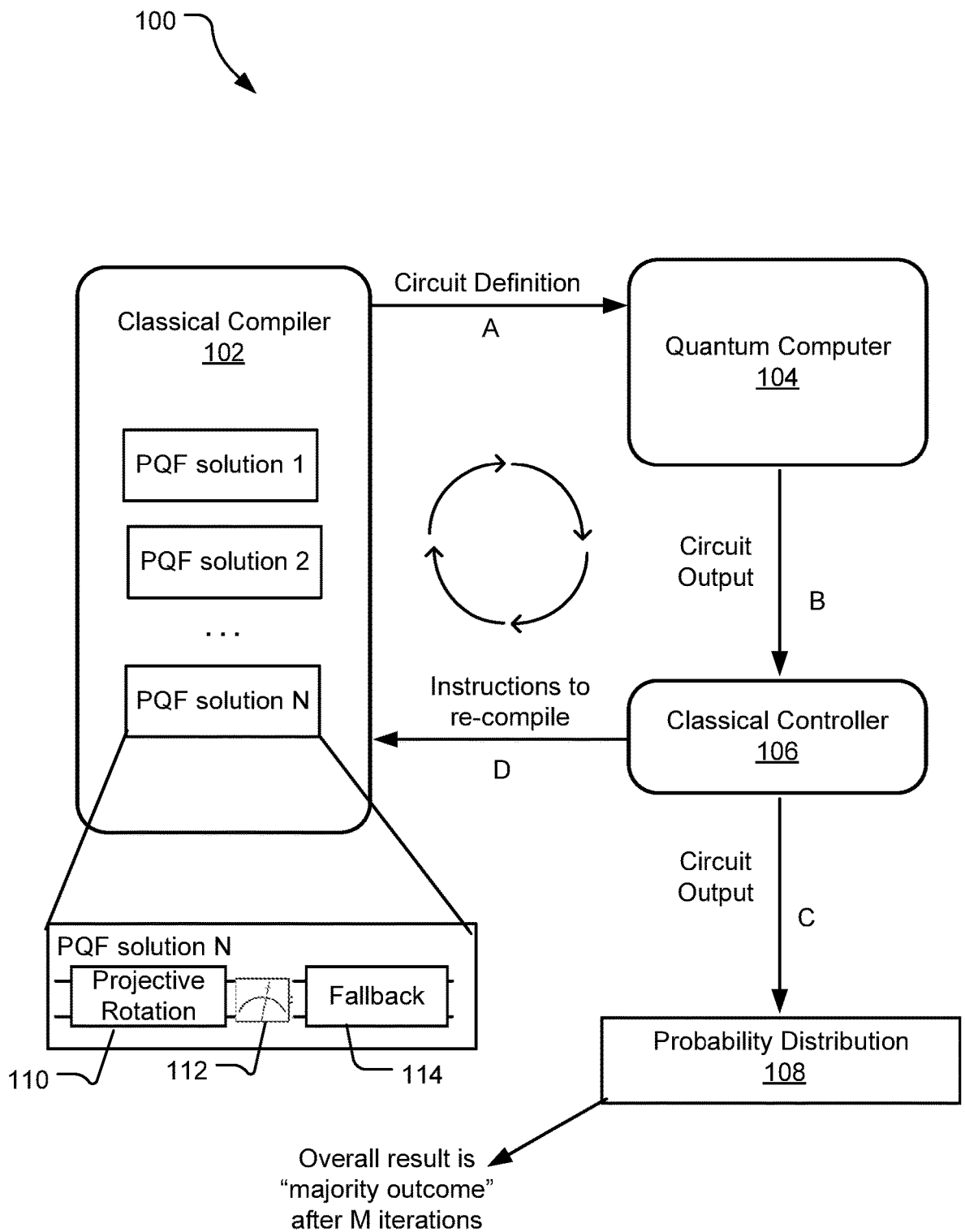
FIG. 1 illustrates an example quantum computing system that uses probabilistic quantum circuits with fallback (PQF) and mixing procedures to reduce the cost of quantum operations while guaranteeing a fixed accuracy result.

In practice, it is difficult or impossible to implement a quantum algorithm with 100% accuracy. Therefore, quantum algorithms are designed such that the answer to a given quantum operation is inferred from multiple measurement outcomes of the quantum algorithm. To find the answer to the quantum algorithm, it is sufficient to ensure that the distribution of measurement outcomes produced by the practical implementation is sufficiently close to an ideal distribution of measurement outcomes.

One challenge for practical implementation is that many operations used by quantum algorithm designers cannot be implemented with 100% accuracy on a fault-tolerant quantum computer. Single-qubit rotation gates are one notable example of this. Single qubit rotation gates are implemented by approximation that consists of many gates. The problem of finding such approximation circuits is the quantum circuit synthesis problem.

The traditional approach to the above-mentioned problem of quantum circuit synthesis is to take a target unitary operation (e.g., quantum state alteration achieved via high-level algorithm) on a single qubit and decompose the operation into a deterministic sequence of gates that may actually be reliably implemented with a select quantum architecture. When using a universal gate set to implement a quantum operation, it is possible to approximate any target unitary to any desired level of accuracy with a sufficiently long sequence of gates and a sufficient number of repeated iterations of the sequence. However, long sequences are costly in terms of processing resources and time.

One solution that presents potential for reducing costs of unitary approximation is to replace the deterministic approach (e.g., costly, long sequence of gates that produce desired outcome) with what is referred to herein as a "probabilistic quantum circuit with fallback" (a PQF). Each PQF is an individual probabilistic circuit that includes one or more multi-qubit probabilistic stages and a final deterministic stage referred to as "a fallback." The probabilistic stage(s) each represent an attempt to implement a target rotation on a data qubit. If measurement indicates that the target rotation was successful, execution of the PQF circuit is complete. If the measurement indicates that the target rotation was not successful, the circuit proceeds to the next stage (either the next probabilistic stage or the final fallback stage). The probabilistic stages preceding the fallback stage entail, at most, a small finite number of attempts (possibly all different) that may be implemented at low cost. If all of the probabilistic stages fail to produce the target rotation, the fallback stage is executed. The fallback represents a final correction step guaranteed to produce the target rotation. Although the fallback step may have considerable cost, the probability of requiring the fallback step can be very small; thus, implementation of the PQF improves the expected cost of implementing the target rotation.

A PQF provides an advantage over the traditional, purely deterministic approach in that the initial probabilistic stage (s) provide a low-cost opportunity to achieve the target rotation with a sufficiently high probability of success such that the fallback stage (e.g., the high-cost solution) is rarely needed.

However, challenges arise in constructing cost-efficient PQFs. There exist many probabilistic circuits that, upon successful measurement, may implement a same target unitary operation to a within a same predefined margin of approximation error (e.g., over-rotation or under-rotation). However, the cost of different probabilistic circuits may vary considerably. As used herein, the "cost" of a quantum circuit generally depends on the number of gates the circuit applies, and in some implementations, may also depend upon a "weight" value that is assigned to each gate (e.g., where the total circuit cost is equal to the sum of each gate multiplied by its respective weight). Each additional gate increases the cost of the quantum computation performed by the circuit.

The technology disclosed herein provides systems and methods for utilizing PQFs to perform quantum operations according to a methodology that substantially reduces the cost of such operations while continuing to guarantee a fixed accuracy. According to one implementation, the foregoing is achieved by (1) identifying multiple different PQFs usable to approximate a same quantum operation within a quantum algorithm and (2) utilizing the different candidate PQFs (defined below) in different respective iterations of the quantum algorithm to obtain a solution to the quantum algorithm. Assume, for example, that a quantum algorithm is performed 100 times to generate a probability distribution from which a final result is inferred (e.g., the result being 1 if the operation outputs '1' more than 50% of the time and 0 if the operation outputs '0' more than 50% of the time). When a quantum operation within the quantum algorithm is implemented according to the herein disclosed methodology, those 100 different instances of the same quantum operation within the algorithm may each be performed by different candidate PQF circuits that are adapted to perform the same quantum operation. As used herein, two PQF circuits are said to be candidate PQF circuits if they each succeed in approximating a target rotation on a single qubit with a success probability in excess of a defined threshold and with an approximation error that is bounded by a pre-defined error margin. This concept of using different candidate PQF solutions in different iterations of a quantum operation used to produce a single probability distribution is referred to herein as "PQF mixing."

FIG. 1 illustrates an example quantum computing system 100 that uses PQF mixing to reduce the cost of quantum operations while guaranteeing a fixed accuracy result. Among other elements, the system 100 includes a classical compiler 102 that executes instructions for identifying multiple candidate PQF solutions (e.g., circuit definitions labeled as PQF solution 1, PQF solution 2) that are each executable to approximating a target unitary that rotates a single qubit by a target rotation to place the qubit in a target state. In different implementations, the set of candidate PQF solutions may be identified to satisfy different criteria including, for example, predefined constraints on one or more of approximation error, gate sequence length, success probability of the projective rotation, etc.

Although other implementations are contemplated, each of the PQFs in FIG. 1 may be understood as including a single projective rotation circuit 110 (e.g., a probabilistic phase) that is followed by a classical measurement 112 and a fallback circuit 114. (e.g., a deterministic phase). The fallback circuit 114 is conditionally executed in scenarios when the classical measurement 112 produces an undesired outcome (e.g., 1), indicating that the projective rotation circuit 110 has failed to produce the desired result. The fallback circuit 114 may be understood as including a sequence of gates effective to deterministically implement a corrective rotation in order to place the qubit in the desired qubit state.

The system 100 further includes a quantum computer 104 and a classical controller 106. The quantum computer 104, classical controller 106, and classical compiler 102 work in concert to perform an iterative loop of operations (e.g., operations A-D) multiple times to obtain a result to a quantum algorithm. For simplicity of example, the quantum algorithm of FIG. 1 is shown to include a single quantum operation that is implemented—at each iteration of the algorithm—by a select one of multiple candidate PQF circuits (PQF solutions). In actual implementations of the technology, the quantum algorithm (e.g., the algorithm represented by the loop operations A-D may) implement multiple quantum operations within each iteration of the loop. The methodology for implementing each different one of these quantum operations within the loop may be performed in the same manner as that described below with respect to a single quantum operation.

Prior to the operations A-D, the classical compiler 102 identifies the PQF solutions available for approximating a target unitary (e.g., a quantum operation). At operation "A" (the beginning of each loop), the classical compiler 102 probabilistically selects one of the PQF solutions to implement the quantum operation and outputs a circuit definition including the selected PQF solution. At operation "B," the quantum computer 104 constructs a quantum circuit based on the circuit definition, executes the circuit, and outputs a result to the quantum algorithm. At operation "C," the classical controller 106 adds the result to a solution set (e.g., as a new point in a probability distribution 108). At operation "D," the classical controller 106 instructs the classical compiler 102 to re-compile the quantum circuit. The operations A-D repeat (with a new probabilistic selection for the quantum operation at operation "A" in each iteration) until the probability distribution 108 includes a sufficient number of points to statistically guarantee, with predefined accuracy, a result to the quantum operation.

Figure 2:
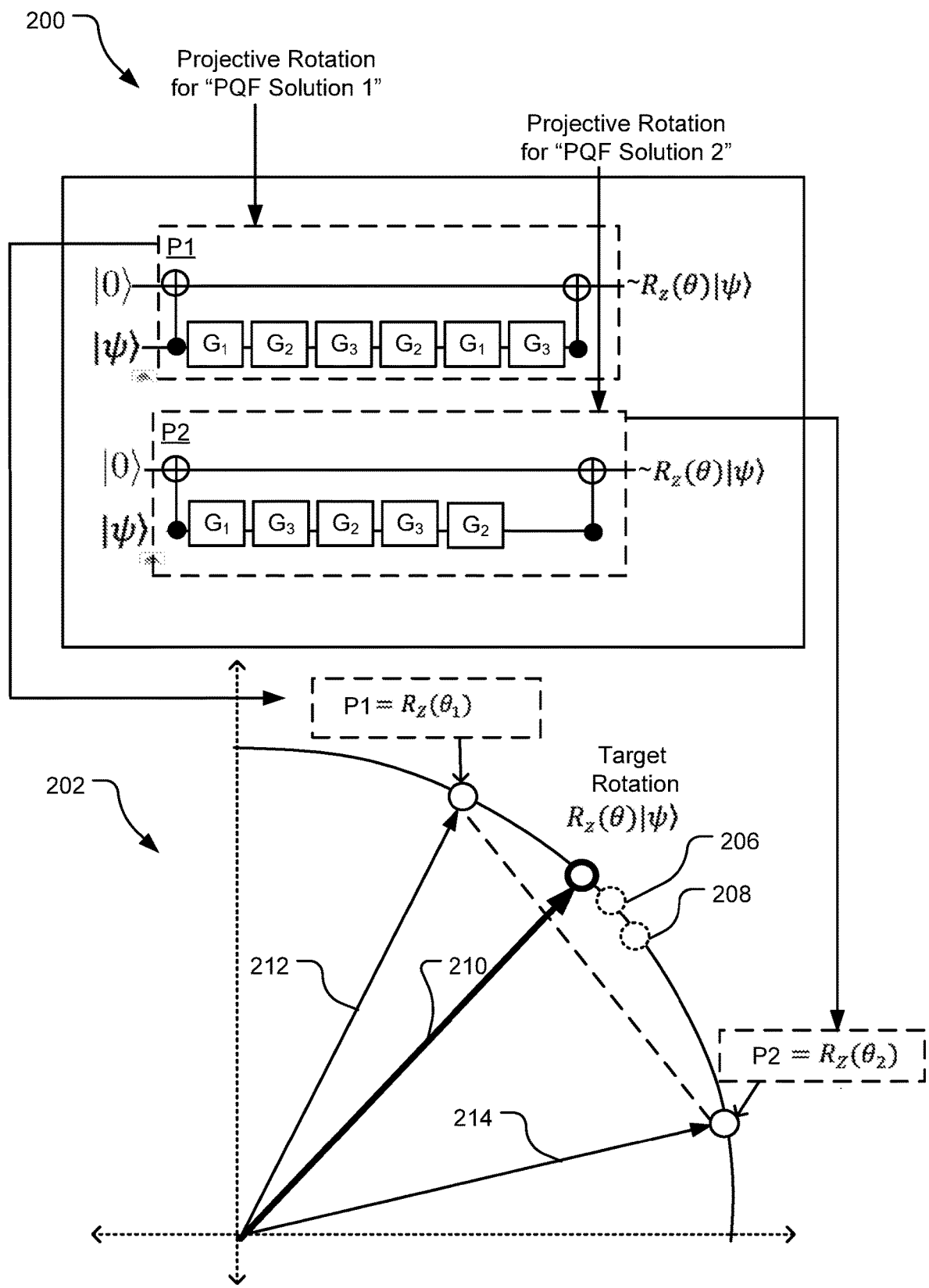
FIG. 2 illustrates exemplary concepts that may be leveraged by a quantum computing system to realize lower-cost PQF circuit implementation as compared to other currently-existing PQF approaches.
Figure 3:
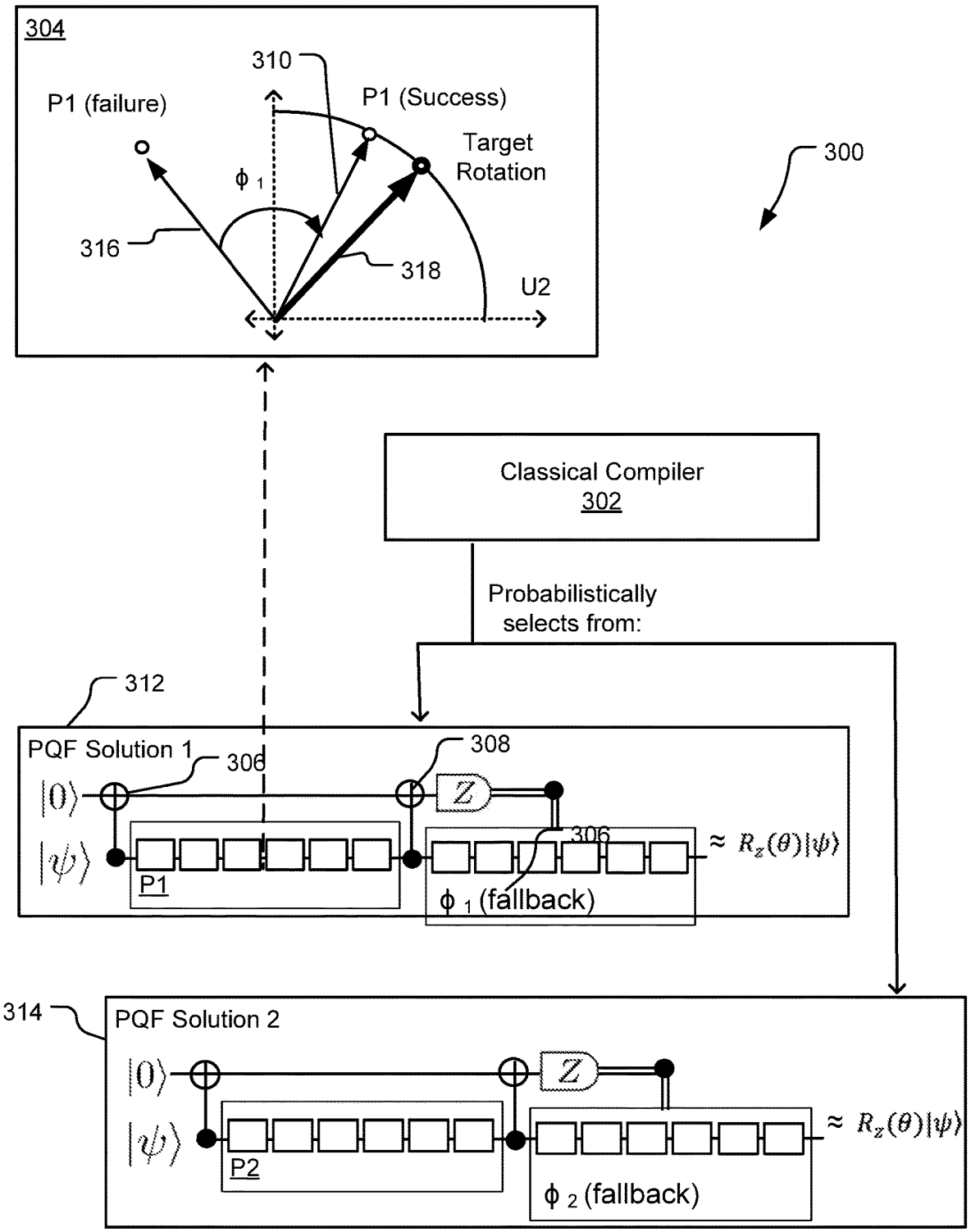
FIG. 3 illustrates further example aspects of a quantum system that employs PQF mixing techniques to reduce the cost of quantum operations while guaranteeing a fixed accuracy result.

As is discussed in greater detail with respect to FIG. 2-3, operation "A" (the probabilistic selection of the PQF solution) provides for a decrease in the overall cost of the quantum operation without a corresponding decreased in accuracy.

In a more realistic implementation of the above, the quantum algorithm of FIG. 1 includes multiple different quantum operations that can each individually be approximated by a discrete set of candidate PQF solutions. For example, the quantum algorithm may prescribe for a sequence of quantum operations "a," "b," and "c," where "a" can be implemented by candidate PQF circuits "a1," "a2," or "a3"; "b" can be implemented by candidate PQF circuits "b1," "b2", or "b3", and "c" can be implemented by candidate PQF circuits "c1," "c2," and "c3." At operation "A," the classical compiler 102 probabilistically selects one of the candidate PQF solutions for each of "a," "b," and "c." For example, on the first iteration of the illustrated loop, the quantum compiler 102 selects a candidate set {a1, b1, c2}; on the second iteration, the quantum compiler 102 selects a candidate set represented by {a2, b1, c2}; on the third iteration, the quantum compiler 102 selects a candidate represented by {a1, b2, c1}, etc. Once the candidate set is chosen (at operation A) for the current iteration of the algorithm, the sequence of candidates is fixed for that iteration.

FIG. 2 illustrates exemplary concepts 200 that may be leveraged by a quantum computing system to realize lower-cost PQF circuit implementation as compared to other currently-exist PQF approaches. FIG. 2 illustrates two exemplary projective rotation circuits P1 and P2, which may be understood as corresponding to the projective rotation 110 phase of two different PQF solutions shown in FIG. 1. Each of P1 and P2 includes a different sequence of gates (e.g., G1, G2, G3, G4) that is designed to approximate a target qubit rotation (e.g., a target unitary) to place a qubit into a target state. The number of gates in each of P1 and P2 may equal or different from one another.

In the illustrated example, the target unitary is $R_z(\theta)$, represented by a vector 210. As background, it is noted that the generic quantum state of a qubit can be represented as a 3D unit vector and the target unitary may be understood as a rotation of that vector in 3D space. When the state of a qubit is physically measured, the measurement produces the measurement produces one of two different basis states $|0\rangle$ and $|1\rangle$. The quantum-mechanical state of a qubit is therefore represented as a state vector that represents a superposition of the two states $|0\rangle$ and $|1\rangle$:

$$|\psi\rangle = \alpha|0\rangle + \beta|1\rangle,$$

where $\alpha$ and $\beta$ are complex numbers and $|\alpha|^2 + |\beta|^2 = 1$. The qubit state vector can be represented in vector notation as:

$$|\psi\rangle = \begin{bmatrix} \alpha \\ \beta \end{bmatrix}.$$

Alternatively, the state vector $|\psi\rangle$ can alternately be expressed, using angles in a spherical coordinate system as:

$$|\psi\rangle = \cos\frac{\theta}{2}|0\rangle + e^{i\phi}\sin\frac{\theta}{2}|1\rangle,$$

which can be visualized in 3D spaces as a vector on a sphere, referred to generally as the "Bloch vector" on the "Bloch sphere" in quantum computing applications. When the qubit is measured, the it collapses into one of the two superimposed states, yielding either a 1 or a 0 according to a known probability.

In quantum mechanics, the Pauli X, Y, and Z matrices give rise to the rotation operators, which rotate the Block vector about the x, y, and z axis according to the following unitary matrices:

$$R_x(\theta) \equiv e^{-\frac{i\theta X}{2}} = \begin{bmatrix} \cos\frac{\theta}{2} & -i\sin\frac{\theta}{2} \\ -\sin\frac{\theta}{2} & \cos\frac{\theta}{2} \end{bmatrix} \quad (1)$$

$$R_y(\theta) \equiv e^{-\frac{i\theta Y}{2}} = \begin{bmatrix} \cos\frac{\theta}{2} & -i\sin\frac{\theta}{2} \\ \sin\frac{\theta}{2} & \cos\frac{\theta}{2} \end{bmatrix} \quad (2)$$

$$R_z(\theta) \equiv e^{-\frac{i\theta Z}{2}} = \begin{bmatrix} e^{-i\theta/2} & 0 \\ 0 & e^{-i\theta/2} \end{bmatrix} \quad (3)$$

Thus, the exemplary target rotation $R_z(\theta)$ in FIG. 2 may be understood as a z-axis rotation as defined by the corresponding one of the Pauli matrices above, while P1 and P2 perform quantum operations that approximate this z-axis rotation (e.g., as shown by vectors 212 and 214) with some probabilistic degree of success. For instance, P1 has a probability q1, which is greater than a defined success threshold q, of effecting a rotation $R_z(\theta_1)$ which may be understood as being a slight over-rotation of the target rotation $R_z(\theta)$. Likewise, P2 has a probability q2, which is greater than the defined success threshold q, of effecting a rotation $R_z(\theta_2)$, which may be understood as being a slight under-rotation of the target rotation $R_z(\theta)$. Although "under-rotation" and "over-rotation" are relative terms when used individually, these terms provide a non-relative basis for defining a pair of projective rotations that, upon success, effect angles of rotation that are on opposite sides of the target rotation vector $R_z(\theta)$, as shown in view 202.

In the example illustrated, the projective rotation circuit P1 is higher cost (has more gates) than the projective rotation circuit P2. However, the projective rotation circuit P1 also provides a rotation $R_z(\theta_1)$ that is a better approximation of the target rotation $R_z(\theta)$ than the rotation $R_z(\theta_2)$ that is approximated by the projective rotation circuit P2. This is illustrative of the challenges related to identifying a lowest cost solution while guaranteeing a fixed accuracy result.

According to one implementation, a quantum computing system such as that shown and described in FIG. 1, is adapted to implement a quantum operation by probabilistically selecting between the PQF solutions (e.g., between a PQF including P1 and between a PQF including P2) on different iterations from which the end result is eventually realized by majority outcome, as described with respect to FIG. 1.

By probabilistically selecting either P1 or P2 (such that are both are used in different iterations of the quantum operation), the resulting probability distribution is shifted to reflect a rotation that is somewhere in between $R_z(\theta_1)$ and $R_z(\theta_2)$—e.g., a better approximation than that provided by either P1 or P2 alone. If, for example, P1 and P2 are selected with equal probability over multiple iterations, the resulting probability distribution may reflect a rotation 206 that halfway in between $R_z(\theta_1)$ and $R_z(\theta_2)$. In one implementation, however, a better approximation is realized by assigning each of P1 and P2 a selection probability that is based on the proximity between their respective rotations ($R_z(\theta_1)$ and $R_z(\theta_2)$) and the target rotation $R_z(\theta)$. For example, since P1 provides a better approximation of the target rotation, P1 is assigned a selection probability (e.g., 60%) that is greater than P2 (e.g., 40%). On each iteration, a random selection is made according to the selection probability (e.g., such that P1 is selected 60% of the time and P2 is selected 40% of the time). The end result is a more accurate approximation, on average, of the target than is realized if the iterations of the quantum operation were based on either P1 and P2 alone. If P1 and P2 are selected according to this approach (with selected probabilities weighted based on approximation accuracy), the probability distribution result from the quantum operation may reflect a rotation 208, which is closer to the target rotation than the alternative approaches.

According to one implementation, a selection probability (p) of P1 is given by equation 4 below, where $\theta$ is the target rotation, $\theta_1$ is the approximation of the target provided by P1, $\theta_2$ is the approximation of the target provided by P2, q1 is the probability that P1 will succeed in rotating the qubit by $\theta_1$, and q2 is the probability that P2 will succeed in rotating the qubit by $\theta_2$.

$$p = \frac{q_2 \sin(\theta_2 - \theta)}{q_2 \sin(\theta_2 - \theta) - q_1 \sin(\theta_1 - \theta)} \quad (4)$$

Notably, the selection probability (p) for P1 is a value that increases in proportion to the proximity between P1's rotation ($R_z(\theta_1)$) and the target rotation ($R_z(\theta)$). The selection probability of P2 in this case becomes (1−p).

FIG. 3 illustrates further example aspects of a quantum system 300 that employs PQF mixing techniques to reduce the cost of quantum operations while guaranteeing a fixed accuracy result. Prior to the start of a quantum operation, the classical compiler 302 identifies at least two projective rotations P1 and P2 that are each effective to approximate a target unitary within a defined rotational error margin and with an associated success probability in excess of a set threshold. P1 and P2 approximate the target unitary in different directions such that P1 corresponds to an over-rotation of the target and P2 corresponds to an under-rotation of the target or vice-versa. Specific aspects of P1 and P2 not explicitly described with respect to FIG. 3 may be assumed the same or similar to those described above with respect to FIG. 2.

Once the over-rotation/under-rotation pair of projective rotations (P1, P2) is identified, the classical compiler 302 constructs a first PQF solution 312 based on P1 and a second PQF solution 314 based on P2.

To implement a quantum operation that is approximated by the PQF solutions, the classical compiler 302 may iterate back and forth with a quantum computer multiple times to re-compile, re-construct, and re-execute a quantum circuit. In each such iteration, the classical compiler 302 provides the quantum computer with a circuit definition that includes a select one of the constructed PQF solutions. The quantum computer constructs the quantum circuit to implement the circuit definition, executes the circuit, and outputs a result, such as in the manner generally described with respect to FIG. 1. Although FIG. 3 illustrates a simplified scenario where the classical compiler 302 initially identifies two PQF solutions, various implementations of the disclosed system may provide for identification of and selection between any number of candidate PQF solutions that are effective to implement the quantum operation.

Each of the PQF solutions includes a projective rotation circuit (P1 or P2) and a corresponding fallback circuit $\Phi 1$ and $\Phi 2$. Since the PQF solutions 312 and 314 have similar elements, the description below is, for simplicity, provided exclusively with respect to the PQF solution 312.

The PQF solution 312 is a circuit that acts on two qubit—a data qubit (represented as $|\psi\rangle$) and an ancilla qubit (represented as $|0\rangle$). The ancilla qubit is entangled with the data qubit such that measurement of the ancilla qubit allows one to infer the state of the data qubit without directly measuring it and thereby destroying the qubit state. In addition to including the projective measurement P1, the PQF solution 312 also includes measurement phases 306 and 308 that provide for classical measurement of the ancilla qubit both before and after the data qubit is rotated by P1.

View 304 is intended to help conceptualize two possible states of the data qubit following the measurement phase 308, which corresponds to the output of P1. Within the PQF solution 312, the annotation "Z" represents the measurement outcome (0 or 1) of the ancilla qubit at the measurement phase 308. If a '0' value is measured here, this indicates that the projective rotation circuit P1 has succeeded in rotating the data qubit by the angle that approximates the target rotation (e.g., a target rotation 318). Within view 304, this "successful" rotation is represented by vector 310. However, with known probability, the projective rotation circuit P1 may rotate the qubit vector by an undesired amount that does not approximate the target rotation 318. This "unsuccessful" (failure) rotation is represented by vector 316.

In mathematical terms, the target rotation 318 can be exemplified as a Z-axis rotation by angle $\theta$, represented as:

$$R(\theta) = \begin{pmatrix} e^{-i\theta/2} & 0 \\ 0 & e^{i\theta/2} \end{pmatrix}$$

Therefore, given a fixed single qubit unitary of the form:

$$U = \begin{pmatrix} u & -v^* \\ v & u^* \end{pmatrix}$$

the projective rotation circuit P1 effects one of two Z-axis rotations on the data qubit ($|\psi\rangle$), depending on the outcome of the measurement phase 308. If the measurement output is zero then:

$$|\psi\rangle \rightarrow R(\theta_1)|\psi\rangle = R(\mathrm{Arg}(u))|\psi\rangle$$

where $\theta_1$ is the angle that successfully approximates the target. Otherwise, if the measurement outcome is one then:

$$|\psi\rangle \rightarrow R(\theta_2)|\psi\rangle = R(\mathrm{Arg}(v))|\psi\rangle$$

where $\theta_2$ is the angle representing the failure case (e.g., vector 316). The projective rotation is considered successful if the measurement outcome at measurement phase 308 is zero and failed when this outcome is one. The probability of success p is given by p=|u|.

Per the above, both the success rotation and the failure rotation for P1 are well defined.

In instances when the projective rotation succeeds at producing the desired outcome (e.g., the approximation of the target rotation), execution of the PQF solution 312 is complete. However, in instances when the projective rotation P1 fails, the data qubit is manipulated by the fallback circuit $\Phi 1$, which performs a corrective rotation with a deterministic result. The fallback circuit $\Phi 1$ is selected to provide a "fallback" rotation $R(\phi_1) \approx R(\theta - \theta_1)$ where $\theta$ is the angle of undesired rotation applied by P1 in a failure scenario. When the fallback procedure is applied, the net effect of the procedure is to rotate the qubit by a corrective rotation such that the resulting qubit state approximates the target state that would have been achieved if the projective rotation circuit P1 had succeed at approximating the target rotation (e.g., the undesired rotation is "undone" and the original target rotation is approximated) such that:

$$|\psi\rangle \to R(\phi_1)R(\theta_2)|\psi\rangle \approx R(\theta)|\psi\rangle.$$

Further operations of the PQF mixing procedure, including construction of the PQFs and their respective elements, are described below with respect to FIGS. 3 and 4.

Figure 4:
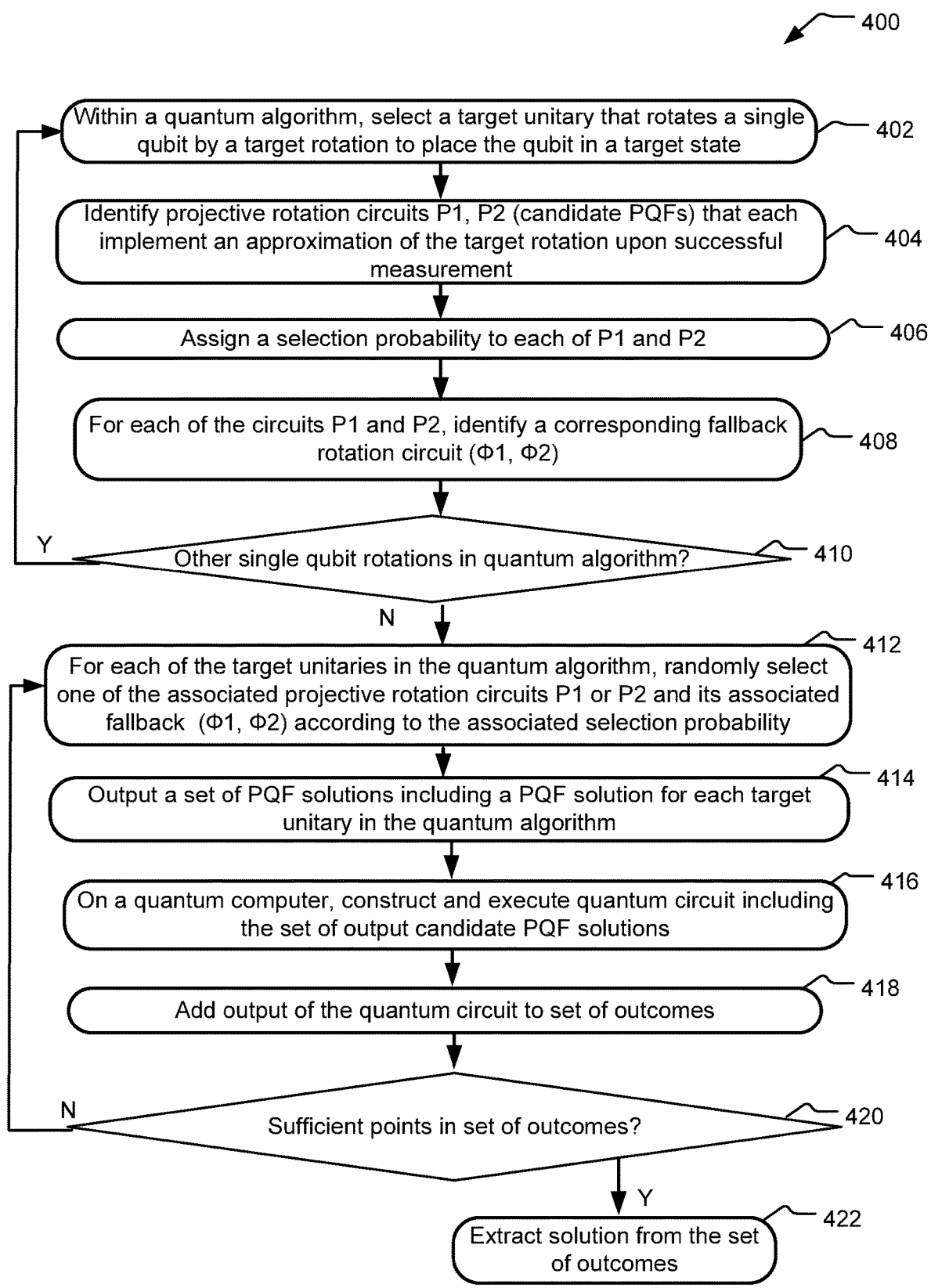
FIG. 4 illustrates example operation for using a PQF mixing procedure to reduce the cost of quantum operations while guaranteeing a fixed accuracy result.

FIG. 4 illustrates example operation 400 for using a PQF mixing procedure to reduce the cost of quantum operations within a quantum algorithm while guaranteeing a fixed accuracy result. A selection operation 402 selects a target unitary within the quantum algorithm that rotates a single qubit by a target rotation to place the qubit in a target state. An identification operation 404 next identifies at least two candidate projective rotation circuits P1, P2 that each implement an approximation of the target rotation upon success measurement. P1 and P2 approximate the target in different directions—e.g., P1 is an over-rotation of the target and P2 is an under-rotation of the target.

According to one implementation, the projective rotation circuit P1 is a circuit that succeeds in approximating the target unitary with a probability $p_1 > q$, where q is a predefined threshold. Upon success, P1 effects $R(\theta_1)$ where $R(\theta)$ is the target rotation and $$\theta < \theta_1 \leq \left(\theta + \frac{\pi}{2}\right).$$

The projective rotation circuit P2 is a circuit that succeeds in approximating the target unitary with a probability $p_2 > q$ and, upon success P2 effects $R(\theta_2)$ such that $$\theta - \frac{\pi}{2} \leq \theta_2 < \theta.$$

A selection probability assignment operation 406 assigns a selection probability to each of P1 and P2 that is based on the accuracy of approximation provided by each. Generally stated, the selection probability is defined by an expression that increases in value in proportion to a proximity between a qubit state resulting from the approximation of the projective rotation circuit (P1 or P2) and the target qubit state. In one implementation, the selection probability of P1 is given by 'p' as defined in equation 4 above. The selection probability of P2 is given by (1−p).

A fallback identification operation 408 identifies a different fallback rotation circuit (Φ1, Φ2) corresponding to each one of the identified projective rotation circuits P1, P2. The fallback circuit is designed to approximate a correctional rotation that deterministically transforms the qubit from the state resulting from the "failure" case of the prior projective rotation P1, P2 to the target qubit state. According to one implementation, the fallback circuit Φ1 is a channel that performs a fallback rotation for P1 by approximating R(θ− φ$_1$) where Φ1 is the rotation obtained from the failure case of P1. Likewise, the fallback circuit Φ2 is a channel that performs a fallback rotation for P2 by approximating R(θ− φ$_2$) where Φ2 is the rotation obtained from the failure case of P2.

By example and without limitation, equation 5 (below) may be used to ensure that approximation accuracy of the entire procedure for obtaining P1, P2, Φ1, and Φ2 is bounded by ε:

$$(2)pq_1 \sin^2(\theta_1-\theta)+(1-p)q_2 \sin^2(\theta_2-\theta)+p(1-q_1)\Delta_1+(1-p)(1-q_2)\Delta_2) < \epsilon \quad (5)$$

where θ is the target rotation, $\theta_1$ is the angle of rotation effected by P1 upon success, $\theta_2$ is the angle of rotation effected by P2 upon success, $\Delta_1$ is the approximation error of the fallback circuit Φ1, $\Delta_2$ is the approximation error of the fallback circuit Φ2, p is the selection probability assigned to P1, (1−p) is the selection probability assigned to P2, q1 is the probability that P1 succeeds, and q2 is the probability the P2 succeeds. In equation 5 above, the first term (from left to right) represents the amount by which P1 contributes to the overall error (e); the second term represents the amount by which P2 contributes to the overall error; the third term represents the amount by which Φ1 contributes to the overall error; and the fourth and final term represents the amount by which Φ2 contributes to the overall error.

Returning to the operations 400, a determination operation 410 determines whether the quantum algorithm includes other target unitaries approximated by single qubit rotations. If so, the operations 402, 404, 406, and 408 are repeated for each such target unitary within the quantum algorithm. If the operations 402, 404, 406, and 408 have been performed with respect to each single qubit rotation in the quantum algorithm, a random selection operation 412 randomly selects, for each of the single-qubit rotations, one of its associated identified projective rotation circuits (P1 or P2) and the associated fallback according to the assigned selection probability (e.g., as given by equation 4 above).

An output operation 414 outputs a set of PQF solutions, where each PQF solution in the set is a solution for an individual one of the single-qubit rotations approximated within the quantum algorithm. For example, each PQF solution within the set of output PQF solutions is for a corresponding one of the target unitaries and includes an associated selected projective rotation circuit and its associated fallback arranged in series with a classical measurement operation in between, such as in the manner described and illustrated with respect to FIG. 3 above.

At operation 416, a quantum computer constructs a quantum circuit including the set of PQF solutions output by the operation 414. The quantum computer executes the quantum circuit. A classical controller receives the output of the quantum circuit and, at operation 418, adds this to the set of outcomes.

A determination operation 420 (e.g., also performed by the classical controller) determines whether the set of outcomes includes a sufficient number of points to satisfy predefined reliability criteria and, if so, a solution extraction operation 422 extracts a solution to the quantum operation from the set of outcomes (e.g., the overall probability of obtaining a 1 or 0 value). If the determination operation 420 determines that there are not yet a sufficient number of points in the set of outcomes to satisfy the predefined reliability criteria, the operations 412, 414, 416, 418, and 420 cyclically repeat until there are a sufficient number of points in the set of outcomes.

Notably, there exist a number of suitable methods for identifying the four channels P1, P2, Φ1 and Φ2. Below, two example constructions are provided.

Simple Construction

In an exemplary "simple" construction, P1, P2, Φ1 and Φ2 are identified by partitioning the total margin of approximation error ϵ four ways such that a maximum error is allocated between each of these four channels. Non-negative values $\epsilon_0$, $\epsilon_1$, $\epsilon_2$ are defined such that $2\epsilon_0+\epsilon_1+\epsilon_2=\epsilon$. This construction entails the following steps:

1. Find a projective (over-)rotation circuit P1 that succeeds with probability $q_1 \leq q$ and upon success effects $R(\theta_1)$ such that $\|R(\theta_1)-(\theta+\delta)\| \leq \epsilon_0$. Let $R(\phi_1)$ be the rotation obtained from the failure case.
2. Using any synthesis algorithm, construct a fallback channel $\Phi1_\square$ that approximates $(R(\theta-\phi_1))$ to with accuracy $$\frac{\epsilon_2}{p(1-q_1)}.$$

3. Find a projective (under-)rotation circuit P2 that succeeds with probability $q_2 \geq q$ and upon success effects $R(\theta_2)$ such that $\|R(\theta_2)-(\theta-\delta)\| \leq \epsilon_0$. Let $R(\phi_2)$ be the rotation obtained from the failure case.
4. Using any synthesis algorithm, construct a fallback channel Φ2 that approximates $(R(\theta-\phi_2))$ to with accuracy $$\frac{\epsilon_2}{(1-p)(1-q)}.$$

Figure 5:
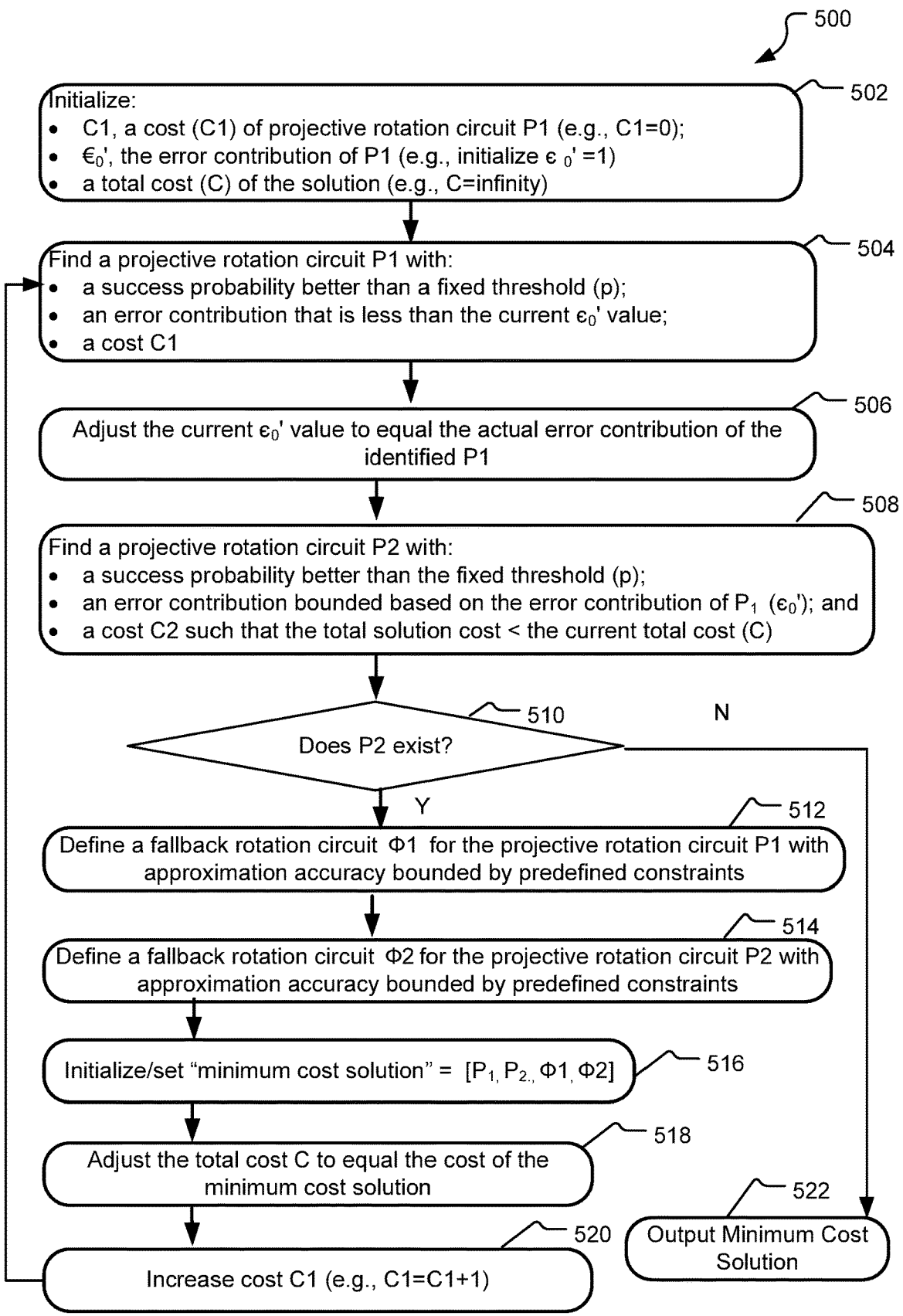
FIG. 5 illustrates example operations that can be performed to identify minimal-cost PQF solutions.

In the above "simple" construction, an equal budget of the total approximation error is allocated between the two projective rotations P1 and P2. While sufficient in some use cases, this equal split assumption neglects to account for the fact that one of the two projections P1 or P2 will be closer to the target than the other. An alternative construction, described below with reference to FIG. 5, provides a methodology that more tightly controls the allocation of approximation error between P1 and P2 such that P2 is allocated an error budget that remains after a selection of P1 is made. This methodology increases the potential to identify lower-cost gate sequences that implement P1 and P2.

Improved Construction

FIG. 5 illustrates example operations 500 that can be performed to identify values for P1, P2, Φ1, and Φ2 that minimize the overall cost of the solution (e.g., a solution that includes two PQF circuits). In particular, this methodology identifies solutions that minimize equation 6 below:

$$(pC_1)+(1-p)(C_2) \qquad (6)$$

where $C_1$ is the cost of (e.g., number of gates in) the first projective rotation P1; p is the probability of selecting P1 (e.g., an assigned selection probability according to equation 4 above); $C_2$ is the cost of the second projective rotation P2; and (1−p) is the probability of selecting P2.

An initialization operation 502 initializes several values that are dynamically updated throughout the iterative operations 500. Specifically, the initialization operation 502 performs the following operations:

(1) initializes a cost term $C_1$, representing the cost of the projective rotation circuit P1, to a low value (e.g., 0);

(2) initializes an error term $\epsilon_0'$, representing the P1's contribution to total approximation error, to a predefined value (e.g., 1);

(3) initializes another cost term C, representing the total cost of the PQF solution, to a large value (e.g., infinity).

A first identification operation 504 next identifies a projective rotation circuit P1 that, upon success effects a rotation $R(\theta_1)$ with a success probability $q_1 > q$, where q is a user-selected fixed threshold (p) and where P1 has an error contribution (e.g., $\sin^2(\theta_1-\theta)$) that is less than the currently-initialized $\epsilon_0'$ value. The identified P1 is required to have a cost equal to the current value of $C_1$. In the initial round of the operations 500, $C_1$ may be initialized to zero, which essentially implies that the algorithm first considers a zero-gate solution (e.g., the approximation error resulting between the qubit state and target state without any rotation). In subsequent iterations of the identification operation 504, $C_1$ assumes other values (e.g., 2, 3, 4, . . . ) for which an actual P1 circuit may be identified.

Provided that a P1 is identified, an adjustment operation 506 adjusts $\epsilon_0'$ (P1's assumed error contribution) to equal the error contribution $(\sin^2(\theta_1-\theta))$ that is identified in association with the identification operation 504.

A second identification 508 attempts to identify a projective rotation circuit P2 that, upon success effects a rotation $R(\theta_2)$ with a success probability $q_2 > q$. P2 is, by definition, an angle represented by a vector on an opposite side of the target $R(\theta)$ as compared to $R(\theta_1)$. Thus, if P1 is an over-rotation of the target, P2 is an under-rotation of the target and vice versa. Mathematically, this constraint may be imposed by requiring that $\text{sign}(\theta-\theta_1) \neq \text{sign}(\theta-\theta_2)$. P2 has an error contribution $(1-p)q_2 \sin^2(\theta_2-\theta)=\epsilon_0$, where $$\epsilon_0 < \frac{\epsilon}{2} - \epsilon_0', \epsilon$$

representing a user-defined total error margin for the PQF solution, and $\epsilon_0'$ being the above-initialized error contribution of the P1 identified during the operation 504. Additionally, the identified P2 is required to have a cost C2 that bounds the cost of the total solution to less than the current value of the minimum cost "C." Mathematically stated, the C2 is selected such that $pC_1+(1-p)C_2<C$.

A determination operation 510 determines whether a P2 exists with aforementioned constraints. During the initial iteration of the operations 500, the initialization of the maximum total cost "C" to a large values (e.g., infinity) ensures that a P2 is found on at least the initial iteration of the operations 500.

Provided that a P2 exists with the above-described constraints, a fallback circuit definition operation 512 defines a first fallback channel Φ1 for the projective rotation circuit P1 that has a cost $D_1$ and that approximates $R(\theta-\phi_1)$, where $\phi_1$ represents the "unsuccessful" rotation implemented by P1 when P1 fails to approximate the target. In one implementation, the approximation error in Φ1 is $\epsilon_1$, bounded such that $$\epsilon_1 < \frac{\epsilon - 2(\epsilon_0 + \epsilon_{0'})}{p(1-q_1)},$$

where the numerator of the right-hand expression represents the total error margin less twice the error contribution of P1 and P2, and the denominator represents the probability of using the fallback Φ1 (e.g., the probability of both selecting P1 and of P1 then failing to approximate the target rotation).

A fallback circuit operation 514 then defines a second fallback channel Φ2 for the projective rotation circuit P2 that has a cost $D_2$ and that approximates $R(\theta-\phi_2)$, where $\phi_2$ represents the "unsuccessful" rotation implemented by P2 when P2 fails to approximate the target. In one implementation, the approximation error in the rotation Φ2 is $\epsilon_2$, bounded such that $$\epsilon_2 < \frac{\epsilon - \epsilon_1 - 2(\epsilon_0 + \epsilon'_0)}{(1-p)(1-q_2)}$$

where the numerator of the right-hand expression represents the total error margin less the contributions of both P1, P2, and Φ1, the denominator represents the probability of using the fallback channel Φ2 (e.g., the probability of both selecting P2 and of P2 then failing to approximate the target).

In various implementations, the fallback rotation circuit operations 512 and 514 may be performed using a variety of suitable synthesis algorithms available in the art.

Once the four channels P1, P2, Φ1, and Φ2 are identified per the operations 502 through 514, a solution update operation 516 updates (or initializes) a variable representing the current "minimum cost solution" set. A parameter update operation 518 updates the total cost parameter "C" (initially set to a large value such as infinity) to now equal the cost of the newly-identified minimum costs solution. An incrementation operation 520 increments the costs C1 (e.g., increasing the permissible number of gates in P1 by 1) and the operations 504-518 repeat, iteratively finding a new (improved) "minimum cost solution" on each round until the determination operation 510 determines that a P2 cannot be identified. At this point in time, an output operation 522 outputs the current "minimum cost solution." (e.g., the four channels P1, P2, Φ1, and Φ2 that satisfy the above-described constraints with a lowest total cost.

Figure 6:
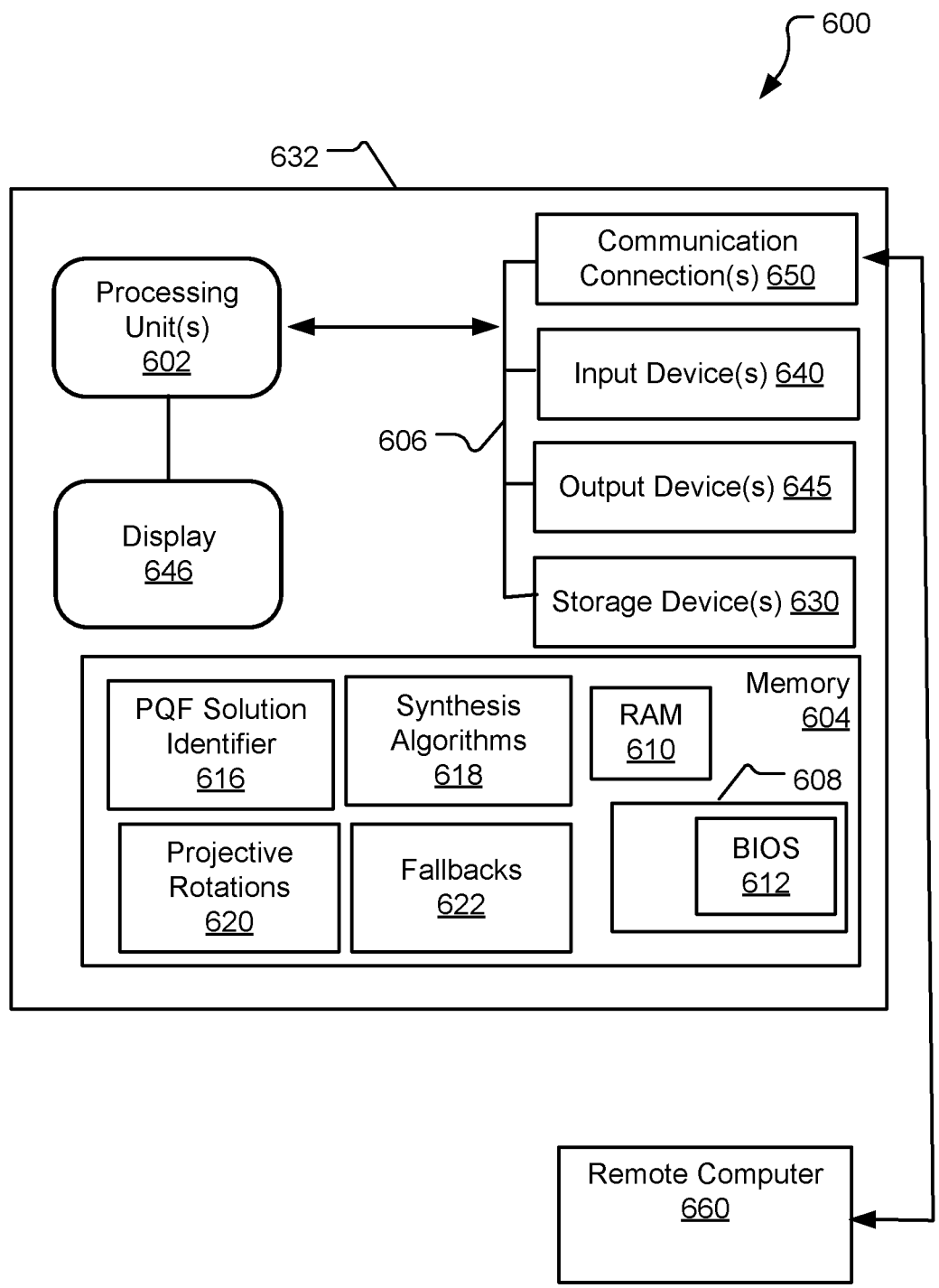
FIG. 6 illustrates an exemplary computing environment suitable for implementing aspects of the disclosed technology.

FIG. 6 and the following discussion are intended to provide a brief, general description of an exemplary computing system 600 in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the disclosed technology includes a processing device 632, including one or more processing units 602, a system memory 604, and a system bus 606 that couples various system components including the system memory 604 to the one or more processing units 602. The system bus 606 may be any of several types of bus structures including a memory bus or memory controller, a peripheral bus, and a local bus using any of a variety of bus architectures. The exemplary system memory 604 includes read only memory (ROM) 608 and random access memory (RAM) 610. A basic input/output system (BIOS) 612, containing the basic routines that help with the transfer of information between elements within the processing device 632, is stored in ROM 608.

Computer-executable instructions for PQF solution identification (e.g., a PQF solution identifier 616) are stored in memory 604 and includes instructions for, for example, identifying low-cost PQFs usable to implement quantum operations and synthesis algorithms 618 for identifying projective rotations and fallbacks that satisfy constraints imposed by the PQF solution identifier 616.

In addition, the memory 604 may also store projective rotation circuits 620 that, upon success, implement an approximation to a desired unitary or procedures associated with the disclosed methods. The memory portion 604 may also store fallback circuit definitions 622. Computer-executable instructions are also stored for receiving rotation angles and precisions as well as communicating circuit definitions.

The computing system 600 further includes one or more storage devices 630 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 606 by a hard disk drive interface, a magnetic disk drive interface, and an optical drive interface, respectively. The drives and their associated computer readable media provide nonvolatile storage of computer-readable instructions, data structures, program modules, and other data for the computing system 500. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 630 including an operating system, one or more application programs, other program modules, and program data. Storage of quantum syntheses and instructions for obtaining such syntheses can be stored in the storage devices 630 as well as or in addition to the system memory 604. A user may enter commands and information into the processing device 632 through one or more input devices 640 such as a keyboard, mouse, touchpad, microphone, etc. These and other input devices may be connected to the one or more processing units 602 through a serial port interface that is coupled to the system bus 606, but may be connected by other interfaces such as a parallel port, game port, or universal serial bus (USB). A display 646 or other type of display device is also connected to the system bus 606 via an interface, such as a video adapter. Other peripheral output devices, such as speakers and printers (not shown), may be included. In some cases, a user interface is display so that a user can input a circuit for synthesis, and verify successful synthesis.

The processing device 632 operate in a networked environment using logical connections to one or more remote computers, such as a remote computer 660. In some examples, one or more network or communication connections 650 are included. The processing device 632 and/or the remote computer 660 can be connected to a logical a local area network (LAN) and a wide area network (WAN). Such networking environments are commonplace in offices, enterprise wide computer networks, intranets, and the Internet.

When used in a LAN networking environment, the processing device 632 is connected to the LAN through a network interface. When used in a WAN networking environment, the processing device 632 typically includes a modem or other means for establishing communications over the WAN, such as the Internet. In a networked environment, program modules depicted relative to the computing system 600, or portions thereof, may be stored in the remote memory storage device or other locations on the LAN or WAN. The network connections shown are exemplary, and other means of establishing a communications link between the computers may be used.

The processing device 632 may include a variety of tangible computer-readable storage media and intangible computer-readable communication signals. Tangible computer-readable storage can be embodied by any available media that can be accessed by the processing device 632 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 632. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 7:
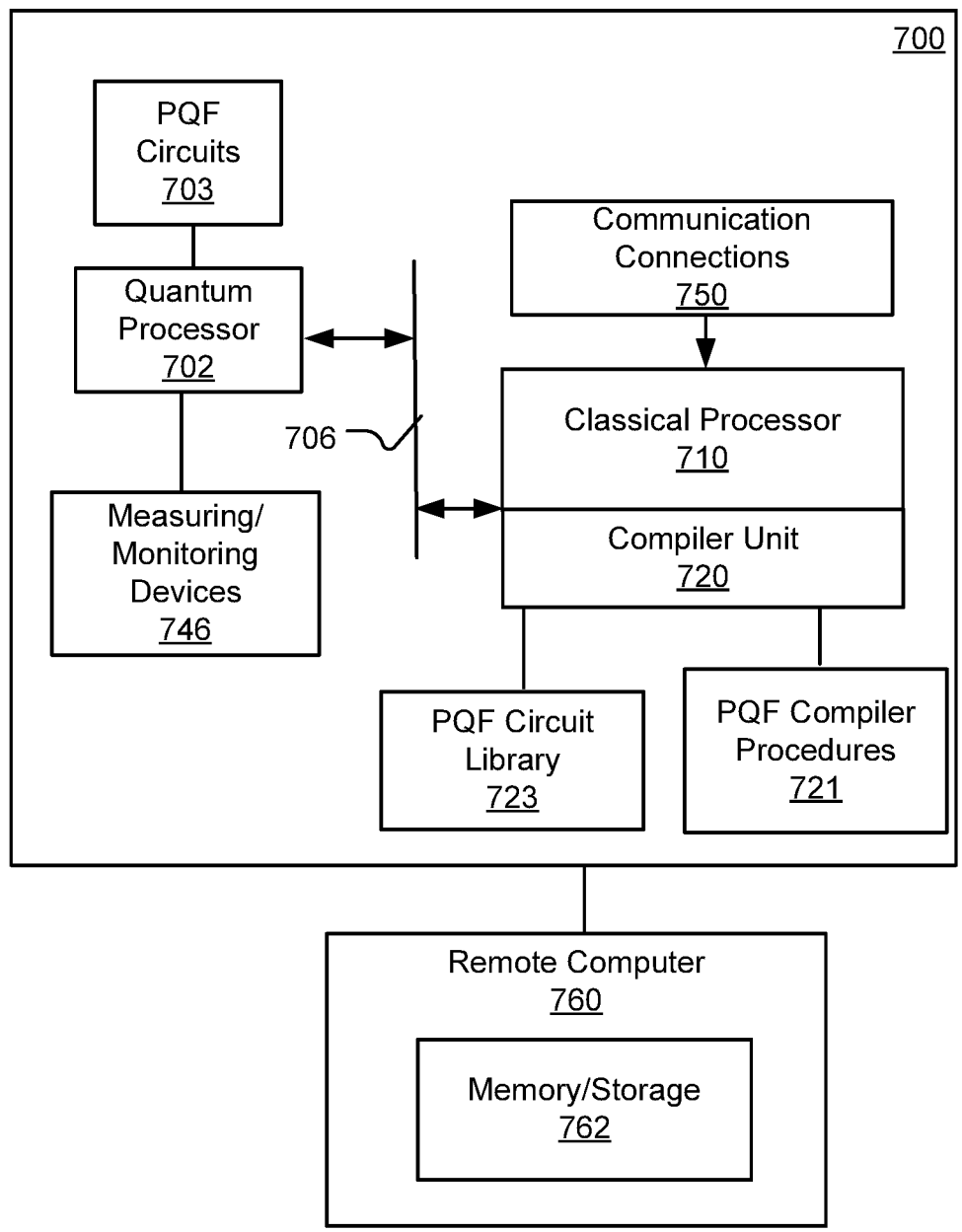
FIG. 7 illustrates an exemplary computing environment suitable for implementing the disclosed technology.

FIG. 7 illustrates another exemplary computing environment 700 suitable for implementing the disclosed technology. The computing environment 700 includes a quantum processing unit 702 and one or more monitoring/measuring device(s) 746. The quantum processor executes quantum circuits that are precompiled by classical compiler unit 720 utilizing one or more classical processor(s) 710. The precompiled quantum circuits such as PQF circuits 703 are downloaded and the instruction set is communicated to the qubits via a bus 706.

Compilation of the PQF circuits 703 entails a process of translating a high-level description of a quantum algorithm into a sequence of quantum circuits. Such high-level description may be stored, as the case may be, on one or more external computer(s) 760 outside the computing environment 700 utilizing one or more memory and/or storage device(s) 762, then downloaded as necessary into the computing environment 700 via one or more communication connection(s) 750. Alternatively, the classical compiler unit 720 is coupled to a classical processor 710 and a PQF compiler procedure library 721 that contains some or all procedures for implementing the methods described above as well as a PQF circuit library 723 that stores compiled circuits.

An example method disclosed herein provides for defining a target unitary that rotates a qubit by a target rotation to place the qubit in a target state and identifying multiple projective rotation circuits that each implement an approximation of the target rotation upon successful measurement. The method further provides for assigning a selection probability to each of the multiple projective rotation circuits where the selection probability of each individual one of the projective rotation circuits increases in proportion to a proximity between a qubit state resulting from the approximation and the target state. The method further provides for probabilistically selecting one of the multiple projective rotation circuits according to the selection probability of each of the multiple projective rotation circuits, and outputting a circuit definition that includes the selected projective rotation circuit.

In example method according to any preceding method, each of the multiple projective rotation circuits places the qubit in an undesired state upon unsuccessful measurement and the method further provides for identifying a corresponding fallback rotation circuit, for each one of the identified multiple projective rotation circuits, approximating a correctional rotation that deterministically transforms the qubit from the undesired state to the target state.

In another example method according to any preceding method, the circuit definition includes the fallback rotation circuit identified for the selected projective rotation circuit.

In still another example method, the circuit definition provides for a projective rotation stage that executes the selected projective rotation circuit, a measurement stage that performs a measurement of the qubit state at an output of the selected projective rotation circuit; and a fallback stage that conditionally executes the fallback rotation circuit identified for the selected projective rotation circuit upon when the measurement is unsuccessful.

In yet still another example method of any preceding method, the method further provides for constructing a quantum circuit based on the circuit definition, the quantum circuit being configured to: provide a data qubit to the selected projective rotation circuit; determine whether the data qubit is in the undesired state at an output of the selected projective rotation circuit; and if the data qubit is in the undesired state, provide the data qubit as input to the fallback rotation circuit corresponding to the selected projective rotation circuit.

In still another example method of any preceding method, identifying the multiple projective rotation circuits further comprises identifying a first projective rotation circuit that implements an over-rotation of the target rotation and identifying a second projective rotation circuit that implements an under-rotation of the target rotation.

In another example method of any preceding method, the method further provides for identifying a first fallback rotation circuit approximating a correctional rotation that deterministically transforms the qubit from a first undesired state to the target state, the first undesired state being a resulting state of the qubit upon execution and unsuccessful measurement of the first projective rotation circuit; and identifying a second fallback rotation circuit approximating a correctional rotation that deterministically transforms the qubit from a second undesired state to the target state, the second undesired state being a resulting state of the qubit upon execution and unsuccessful measurement of the second projective rotation circuit.

In still another example method of any preceding method, the first projective rotation circuit, the second projective rotation circuit, the first fallback rotation circuit, and the second fallback rotation circuit comprise a circuit group and are selected to minimize a total cost associated with the circuit group.

In yet another example method, the first projective rotation circuit, the second projective rotation circuit, the first fallback rotation circuit, and the second fallback rotation circuit are selected to cap a total approximation error associated with the group to within a predefined error margin.

An example system disclosed herein includes at least memory, a processor and a quantum circuit compiler stored in memory and executable by the processor to perform operations including: defining a target unitary that rotates a qubit by a target rotation to place the qubit in a target state; identifying multiple projective rotation circuits that each implement an approximation of the target rotation upon successful measurement; assigning a selection probability to each of the multiple projective rotation circuits, the selection probability of each individual one of the projective rotation circuits increasing in proportion to a proximity between a qubit state resulting from the approximation and the target state; probabilistically selecting one of the multiple projective rotation circuits according to the selection probability of each of the multiple projective rotation circuits; and outputting a circuit definition that includes the selected projective rotation circuit.

In any example system of any preceding system, each of the multiple projective rotation circuits places the qubit in an undesired state upon unsuccessful measurement and the quantum circuit compiler is further configured to: identify a corresponding fallback rotation circuit approximating a correctional rotation for each one of the identified multiple projective rotation circuits, the correctional rotation effective to deterministically transform the qubit from the undesired state to the target state.

In another example system of any preceding system, the circuit definition includes the fallback rotation circuit identified for the selected projective rotation circuit.

In still another example system of any preceding system, the circuit definition provides for: a projective rotation stage that executes the selected projective rotation circuit; a measurement stage that performs a measurement of the qubit state at an output of the selected projective rotation circuit; and a fallback stage that conditionally executes the fallback rotation circuit identified for the selected projective rotation circuit upon when the measurement is unsuccessful.

In yet another example system of any preceding system, the system further comprises a quantum computer configured to construct a quantum circuit based on the circuit definition. The quantum circuit is configured to provide a data qubit to the selected projective rotation circuit; at an output of the selected projective rotation circuit, determine whether the data qubit is in the undesired state; and if the data qubit is in the undesired state, provide the data qubit as input to the fallback rotation circuit corresponding to the selected projective rotation circuit.

In still another example system of any preceding system, the quantum circuit compiler identifies the multiple projective rotation circuits by: identifying a first projective rotation circuit that implements an over-rotation of the target rotation; and identifying a second projective rotation circuit that implements an under-rotation of the target rotation.

In yet still another example system of any preceding system, the quantum circuit compiler is further configured to identify a first fallback rotation circuit approximating a correctional rotation that deterministically transforms the qubit from a first undesired state to the target state and identify a second fallback rotation circuit approximating a correctional rotation that deterministically transforms the qubit from a second undesired state to the target state. The first undesired state is a resulting state of the qubit upon execution and unsuccessful measurement of the first projective rotation circuit, and the second undesired state is a resulting state of the qubit upon execution and unsuccessful measurement of the first projective rotation circuit.

In still another example system of any preceding system, the first projective rotation circuit, the second projective rotation circuit, the first fallback rotation circuit, and the second fallback rotation circuit are members of a circuit group and the quantum circuit compiler is further configured to select the members of the circuit group to minimize a total cost associated with the circuit group.

In another example system of any preceding system, the quantum circuit compiler is further configured to select the first projective rotation circuit, the second projective rotation circuit, the first fallback rotation circuit, and the second fallback rotation circuit to cap a total approximation error associated with the group to within a predefined error margin.

An example tangible computer-readable storage media encodes computer-readable instructions for executing a computer process comprising: defining a target unitary that rotates a qubit by a target rotation to place the qubit in a target state; identifying a first projective rotation circuit that implements a first approximation of the target rotation upon successful measurement; identifying a second projective rotation circuit that implements a second approximation of the target rotation upon successful measurement; assigning a first selection probability to the first projective rotation circuit, the first selection probability increasing in proportion to a proximity between a qubit state resulting from the first approximation of the target state and the target state; assigning a second selection probability to the second projective rotation circuit, the second selection probability increasing in proportion to a proximity between a qubit state resulting from the second approximation of the target state and the target state; probabilistically selecting one of the first projective rotation circuit and the second projective rotation circuit based on the associated assigned selection probabilities; and outputting a circuit definition that includes the selected projective rotation circuit.

In an example tangible computer-readable storage media of any preceding computer-readable storage media, the computer process further comprises: identifying a group of fallback circuits that includes a first fallback rotation circuit approximating a correctional rotation that deterministically transforms the qubit from a first undesired state to the target state and a second fallback rotation circuit approximating a correctional rotation that deterministically transforms the qubit from a second undesired state to the target state. The first undesired state is a resulting state of the qubit upon execution and unsuccessful measurement of the first projective rotation circuit, and the second undesired state is a resulting state of the qubit upon execution and unsuccessful measurement of the second projective rotation circuit. The circuit definition includes a member of the group of fallback circuits providing a correctional rotation associated with the selected projective rotation circuit.

An example system disclosed herein provides a means for defining a target unitary that rotates a qubit by a target rotation to place the qubit in a target state and a means for identifying multiple projective rotation circuits that each implement an approximation of the target rotation upon successful measurement. The system further provides a means for assigning a selection probability to each of the multiple projective rotation circuits, where the selection probability of each individual one of the projective rotation circuits increases in proportion to a proximity between a qubit state resulting from the approximation and the target state. The system further provides a means for probabilistically selecting one of the multiple projective rotation circuits according to the selection probability of each of the multiple projective rotation circuits, and a means for outputting a circuit definition that includes the selected projective rotation circuit.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
defining a target unitary that rotates a qubit by a target rotation to place the qubit in a target state;
identifying multiple projective rotation circuits that each implement an approximation of the target rotation upon successful measurement;
assigning a selection probability to each of the multiple projective rotation circuits, the selection probability of each individual one of the projective rotation circuits increasing in proportion to a proximity between a qubit state resulting from the approximation and the target state;
according to the selection probability of each of the multiple projective rotation circuits, probabilistically selecting one of the multiple projective rotation circuits; and
outputting a circuit definition that includes the selected projective rotation circuit.

2. The method of claim 1, wherein each of the multiple projective rotation circuits places the qubit in an undesired state upon unsuccessful measurement and the method further comprises:
for each one of the identified multiple projective rotation circuits, identifying a corresponding fallback rotation circuit approximating a correctional rotation that deterministically transforms the qubit from the undesired state to the target state.

3. The method of claim 2 wherein the circuit definition includes the fallback rotation circuit identified for the selected projective rotation circuit.

4. The method of claim 3, wherein the circuit definition provides for:
a projective rotation stage that executes the selected projective rotation circuit;
a measurement stage that performs a measurement of the qubit state at an output of the selected projective rotation circuit; and
a fallback stage that conditionally executes the fallback rotation circuit identified for the selected projective rotation circuit upon when the measurement is unsuccessful.

5. The method of claim 2, further comprising:
constructing a quantum circuit based on the circuit definition, the quantum circuit being configured to:
provide a data qubit to the selected projective rotation circuit;
at an output of the selected projective rotation circuit, determine whether the data qubit is in the undesired state; and
if the data qubit is in the undesired state, provide the data qubit as input to the fallback rotation circuit corresponding to the selected projective rotation circuit.

6. The method of claim 1, wherein identifying the multiple projective rotation circuits further comprises:
identifying a first projective rotation circuit that implements an over-rotation of the target rotation; and
identifying a second projective rotation circuit that implements an under-rotation of the target rotation.

7. The method of claim 6, further comprising:
identifying a first fallback rotation circuit approximating a correctional rotation that deterministically transforms the qubit from a first undesired state to the target state, the first undesired state being a resulting state of the qubit upon execution and unsuccessful measurement of the first projective rotation circuit; and
identifying a second fallback rotation circuit approximating a correctional rotation that deterministically transforms the qubit from a second undesired state to the target state, the second undesired state being a resulting state of the qubit upon execution and unsuccessful measurement of the second projective rotation circuit.

8. The method of claim 7, wherein the first projective rotation circuit, the second projective rotation circuit, the first fallback rotation circuit, and the second fallback rotation circuit comprise a circuit group and are selected to minimize a total cost associated with the circuit group.

9. The method of claim 8, wherein the first projective rotation circuit, the second projective rotation circuit, the first fallback rotation circuit, and the second fallback rotation circuit are selected to cap a total approximation error associated with the group to within a predefined error margin.

10. A system comprising:
memory;
a processor;
a quantum circuit compiler stored in the memory and executable by the processor to:
define a target unitary that rotates a qubit by a target rotation to place the qubit in a target state;
identify multiple projective rotation circuits that each implement an approximation of the target rotation upon successful measurement;
assign a selection probability to each of the multiple projective rotation circuits, the selection probability of each individual one of the projective rotation circuits increasing in proportion to a proximity between a qubit state resulting from the approximation and the target state;
according to the selection probability of each of the multiple projective rotation circuits, probabilistically select one of the multiple projective rotation circuits; and
output a circuit definition that includes the selected projective rotation circuit.

11. The system of claim 10, wherein each of the multiple projective rotation circuits places the qubit in an undesired state upon unsuccessful measurement and the quantum circuit compiler is further configured to:
for each one of the identified multiple projective rotation circuits, identify a corresponding fallback rotation circuit approximating a correctional rotation that deterministically transforms the qubit from the undesired state to the target state.

12. The system of claim 11, wherein the circuit definition includes the fallback rotation circuit identified for the selected projective rotation circuit.

13. The system of claim 12, wherein the circuit definition provides for:
  a projective rotation stage that executes the selected projective rotation circuit;
  a measurement stage that performs a measurement of the qubit state at an output of the selected projective rotation circuit; and
  a fallback stage that conditionally executes the fallback rotation circuit identified for the selected projective rotation circuit upon when the measurement is unsuccessful.

14. The system of claim 11, further comprising:
  a quantum computer configured to construct a quantum circuit based on the circuit definition, the quantum circuit being configured to:
    provide a data qubit to the selected projective rotation circuit;
    at an output of the selected projective rotation circuit, determine whether the data qubit is in the undesired state; and
    if the data qubit is in the undesired state, provide the data qubit as input to the fallback rotation circuit corresponding to the selected projective rotation circuit.

15. The system of claim 10, wherein the quantum circuit compiler identifies the multiple projective rotation circuits by:
  identifying a first projective rotation circuit that implements an over-rotation of the target rotation; and
  identifying a second projective rotation circuit that implements an under-rotation of the target rotation.

16. The system of claim 15, wherein the quantum circuit compiler is further configured to:
  identify a first fallback rotation circuit approximating a correctional rotation that deterministically transforms the qubit from a first undesired state to the target state, the first undesired state being a resulting state of the qubit upon execution and unsuccessful measurement of the first projective rotation circuit; and
  identify a second fallback rotation circuit approximating a correctional rotation that deterministically transforms the qubit from a second undesired state to the target state, the second undesired state being a resulting state of the qubit upon execution and unsuccessful measurement of the first projective rotation circuit.

17. The system of claim 16, wherein the first projective rotation circuit, the second projective rotation circuit, the first fallback rotation circuit, and the second fallback rotation circuit are members of a circuit group and the quantum circuit compiler is further configured to select the members of the circuit group to minimize a total cost associated with the circuit group.

18. The system of claim 17, wherein the quantum circuit compiler is further configured to select the first projective rotation circuit, the second projective rotation circuit, the first fallback rotation circuit, and the second fallback rotation circuit to cap a total approximation error associated with the group to within a predefined error margin.

19. One or more tangible computer-readable storage media encoding computer-readable instructions for executing a computer process comprising:
  defining a target unitary that rotates a qubit by a target rotation to place the qubit in a target state;
  identifying a first projective rotation circuit that implements a first approximation of the target rotation upon successful measurement;
  identifying a second projective rotation circuit that implements a second approximation of the target rotation upon successful measurement;
  assigning a first selection probability to the first projective rotation circuit, the first selection probability increasing in proportion to a proximity between a qubit state resulting from the first approximation of the target state and the target state;
  assigning a second selection probability to the second projective rotation circuit, the second selection probability increasing in proportion to a proximity between a qubit state resulting from the second approximation of the target state and the target state;
  probabilistically selecting one of the first projective rotation circuit and the second projective rotation circuit based on the associated assigned selection probabilities; and
  outputting a circuit definition that includes the selected projective rotation circuit.

20. The one or more tangible computer-readable storage media of claim 19, wherein the computer process further comprises:
  identifying a group of fallback circuits, the group including:
    a first fallback rotation circuit approximating a correctional rotation that deterministically transforms the qubit from a first undesired state to the target state, the first undesired state being a resulting state of the qubit upon execution and unsuccessful measurement of the first projective rotation circuit; and
    a second fallback rotation circuit approximating a correctional rotation that deterministically transforms the qubit from a second undesired state to the target state, the second undesired state being a resulting state of the qubit upon execution and
  unsuccessful measurement of the second projective rotation circuit, wherein the circuit definition includes a member of the group of fallback circuits providing a correctional rotation associated with the selected projective rotation circuit.

* * * * *